US012289782B2

(12) United States Patent
Prabhakar et al.

(10) Patent No.: US 12,289,782 B2
(45) Date of Patent: Apr. 29, 2025

(54) COMMUNICATION COORDINATION AND POWER SAVING TECHNIQUES FOR MULTI-SUBSCRIBER IDENTITY MODULE DEVICES

(71) Applicant: Apple Inc., Cupertino, CA (US)

(72) Inventors: Alosious Pradeep Prabhakar, Singapore (SG); Vijay Venkataraman, San Jose, CA (US); Han Pu, Shanghai (CN); Madhukar K Shanbhag, Santa Clara, CA (US); Sandeep K Sunkesala, San Jose, CA (US); Sanjeevi Balasubramanian, San Jose, CA (US); Shiva Krishna Narra, San Jose, CA (US); Sriram Subramanian, San Jose, CA (US); Tarakkumar G Dhanani, San Jose, CA (US); Vishwanth Kamala Govindaraju, Mountain View, CA (US); Wei Zhang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 17/778,363

(22) PCT Filed: May 27, 2021

(86) PCT No.: PCT/CN2021/096469
§ 371 (c)(1),
(2) Date: May 19, 2022

(87) PCT Pub. No.: WO2022/246751
PCT Pub. Date: Dec. 1, 2022

(65) Prior Publication Data
US 2023/0284308 A1    Sep. 7, 2023

(51) Int. Cl.
*H04W 76/16* (2018.01)
*H04W 60/04* (2009.01)

(52) U.S. Cl.
CPC .......... *H04W 76/16* (2018.02); *H04W 60/04* (2013.01)

(58) Field of Classification Search
None
See application file for complete search history.

(56) References Cited

U.S. PATENT DOCUMENTS

2020/0015303 A1* 1/2020 Tsai ................... H04W 8/183
2020/0068647 A1  2/2020 Jha et al.
2021/0384949 A1* 12/2021 Kumar ................ H04W 76/15

FOREIGN PATENT DOCUMENTS

CN   112218310 A   1/2021
CN   112218370 A   1/2021
(Continued)

OTHER PUBLICATIONS

Partial Supplementary European Search Report for EP Patent Application 21890372.2; 12 pages; Nov. 2, 2022.
(Continued)

*Primary Examiner* — Anh Ngoc M Nguyen
(74) *Attorney, Agent, or Firm* — Kowert, Hood, Munyon, Rankin & Goetzel, P.C.

(57) ABSTRACT

A wireless device may connect, using a first subscriber identity module (SIM), to a first base station according to a first radio access technology (RAT) and a second base station according to a second RAT. The wireless device may also connect, using a second SIM, to a third base station according to the first RAT. The wireless device may, in response to the second SIM performing a call according to the first RAT, disable the first RAT for the first SIM and perform, using the first SIM, data communication according (Continued)

to the second RAT while the call is performed using the second SIM.

20 Claims, 18 Drawing Sheets

(56) References Cited

FOREIGN PATENT DOCUMENTS

| | | |
|---|---|---|
| EP | 3764677 | 1/2021 |
| WO | 2020045952 | 3/2020 |
| WO | 2021011310 A1 | 1/2021 |

OTHER PUBLICATIONS

International Search Report and Written Opinion for PCT/CN2021/096469; 9 pages; Feb. 16, 2022.

* cited by examiner

COMMUNICATION COORDINATION AND POWER SAVING TECHNIQUES FOR MULTI-SUBSCRIBER IDENTITY MODULE DEVICES

PRIORITY CLAIM

This application is a national phase entry of PCT application number PCT/CN2021/096469, entitled "Communication Coordination and Power Saving Techniques for Multi-Subscriber Identity Module Devices," filed May 27, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatuses, systems, and methods for coordinating communication and providing power saving techniques for multi-subscriber identity module devices in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The increasing number of features and functionality introduced in wireless communication devices also creates a continuous need for improvement in both wireless communications and in wireless communication devices. In particular, it is important to ensure the accuracy of transmitted and received signals through user equipment devices (UEs), e.g., through wireless devices such as cellular phones, base stations and relay stations used in wireless cellular communications. For example, some UEs may include multiple subscriber identity modules (SIMs) which may be active concurrently. Under some circumstances, collisions may occur between transmissions to such UEs associated with different SIMs. Such collisions may negatively impact user experience and performance of the UE. In addition, increasing the functionality of a UE device can place a significant strain on the battery life of the UE device. For example, certain paging schedules for different SIMs may require increased power use. Thus, it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for coordinating communication and providing power saving techniques for multi-subscriber identity module devices in a wireless communication system.

In some embodiments, a wireless device may connect, using a first subscriber identity module (SIM), to a first base station according to a first radio access technology (RAT) and a second base station according to a second RAT. The wireless device may also connect, using a second SIM, to a third base station according to the first RAT. The wireless device may, in response to the second SIM performing a call according to the first RAT, disable the first RAT for the first SIM and perform, using the first SIM, data communication according to the second RAT while the call is performed using the second SIM.

In some embodiments, the first RAT may correspond to long-term evolution (LTE), the second RAT may correspond to new radio (NR), and the wireless device may be configured to perform the call using the second SIM further using voice over long-term evolution (VoLTE).

According to some embodiments, the wireless device may be configured to transmit to the second base station, using the first SIM, at least one of an indication of the first SIM's disabling of the first RAT and a registration request message. Additionally, or alternatively the wireless device may be configured to receive, using the first SIM, a registration accept message from the second base station in response to the registration request message, according to some embodiments.

In some embodiments, the wireless device may be configured to reconfigure, in response to receiving the registration accept message, the first SIM from a non-standalone (NSA) configuration to a stand-alone (SA) configuration.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
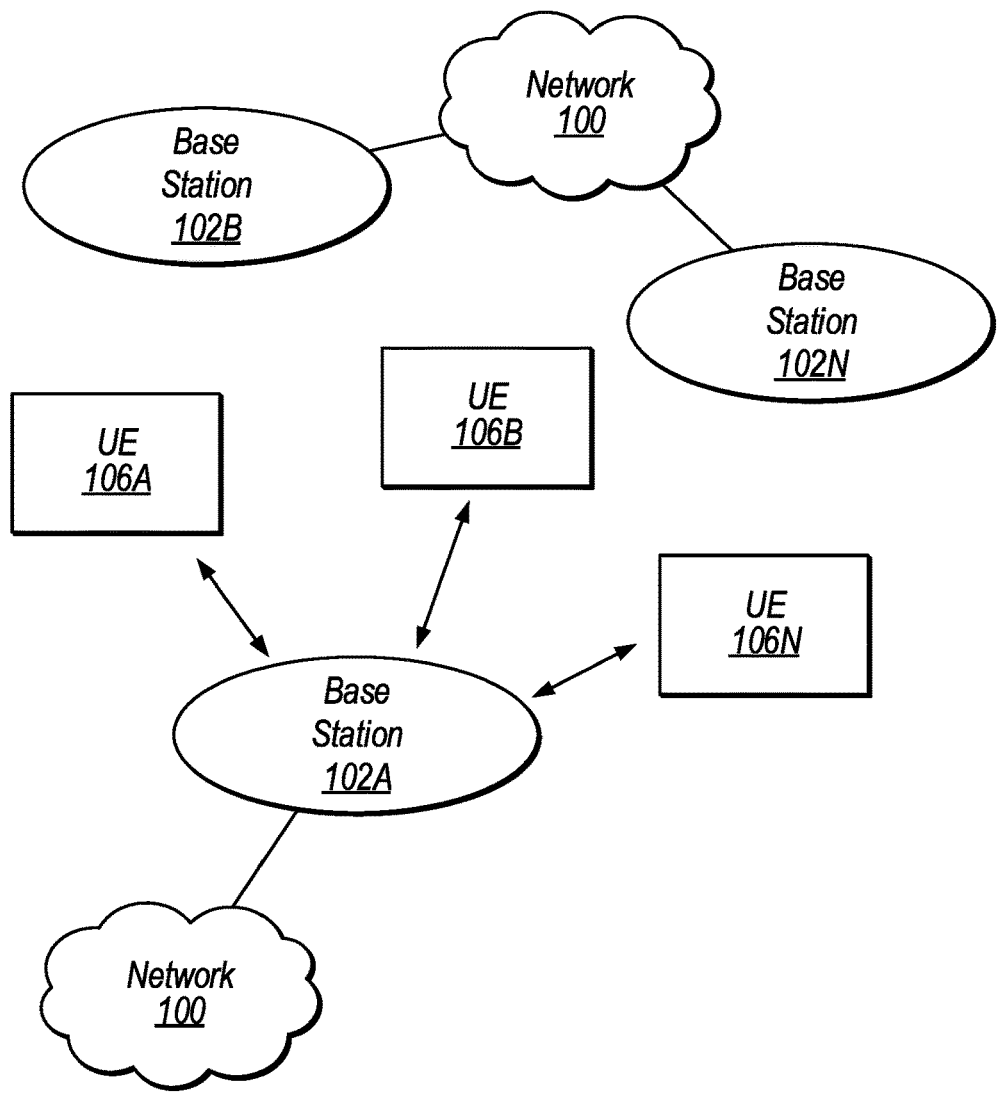
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
SGS: 5G System
SGMM: 5GS Mobility Management
SGC: 5G Core Network
IE: Information Element
TX: Transmission/Transmit
RX: Reception/Receive
LAN: Local Area Network
WLAN: Wireless LAN
AP: Access Point
EPC: Evolved Packet Core
IEEE: Institute of Electrical and Electronics Engineers
Wi-Fi: Wireless Local Area Network (WLAN) RAT based on the IEEE 802.11 standards
MUSIM: Multiple Subscriber Identity Module
SIM: Subscriber Identity Module
DDS: Default Data SIM
nDDS: Non-Default Data SIM
SA: Stand Alone
NSA: Non-Stand Alone
EN-DC: Enhanced Dual Connectivity
SIB: System Information Block
CSFB: Circuit Switched Fallback
FR: Frequency Range
AMF: 5G Core Access and Mobility Management Function
SG: Signaling Gateway
SDM: Subscriber Data Management
UI: User Interface
EPSFB: Evolved Packet System Fallback
IP: Internet Protocol
IMS: IP Multimedia Subsystem
VoLTE: Voice over LTE
MAC-CE: Media Access Control-Control Element
UCI: Uplink Control Information
SRB: Signaling Radio Bearer
MGNB: Master gNB
SGNB: Secondary gNB
NAS: Non-Access Stratum
MME: Mobility Management Entity
MR: Measurement Report Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
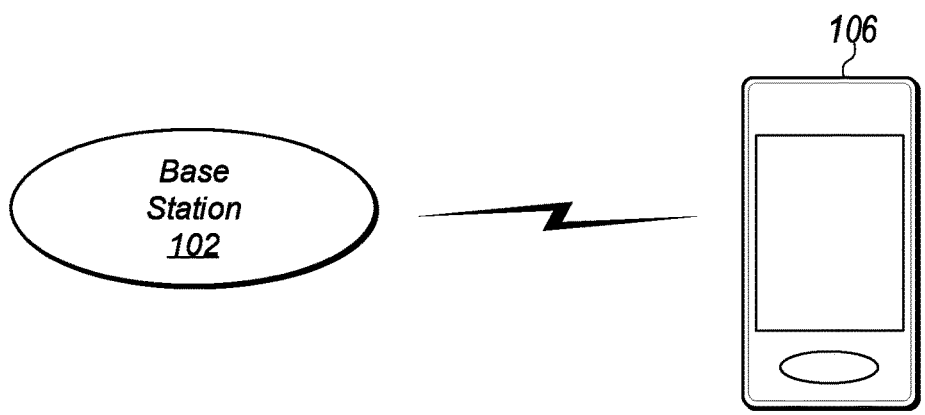
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
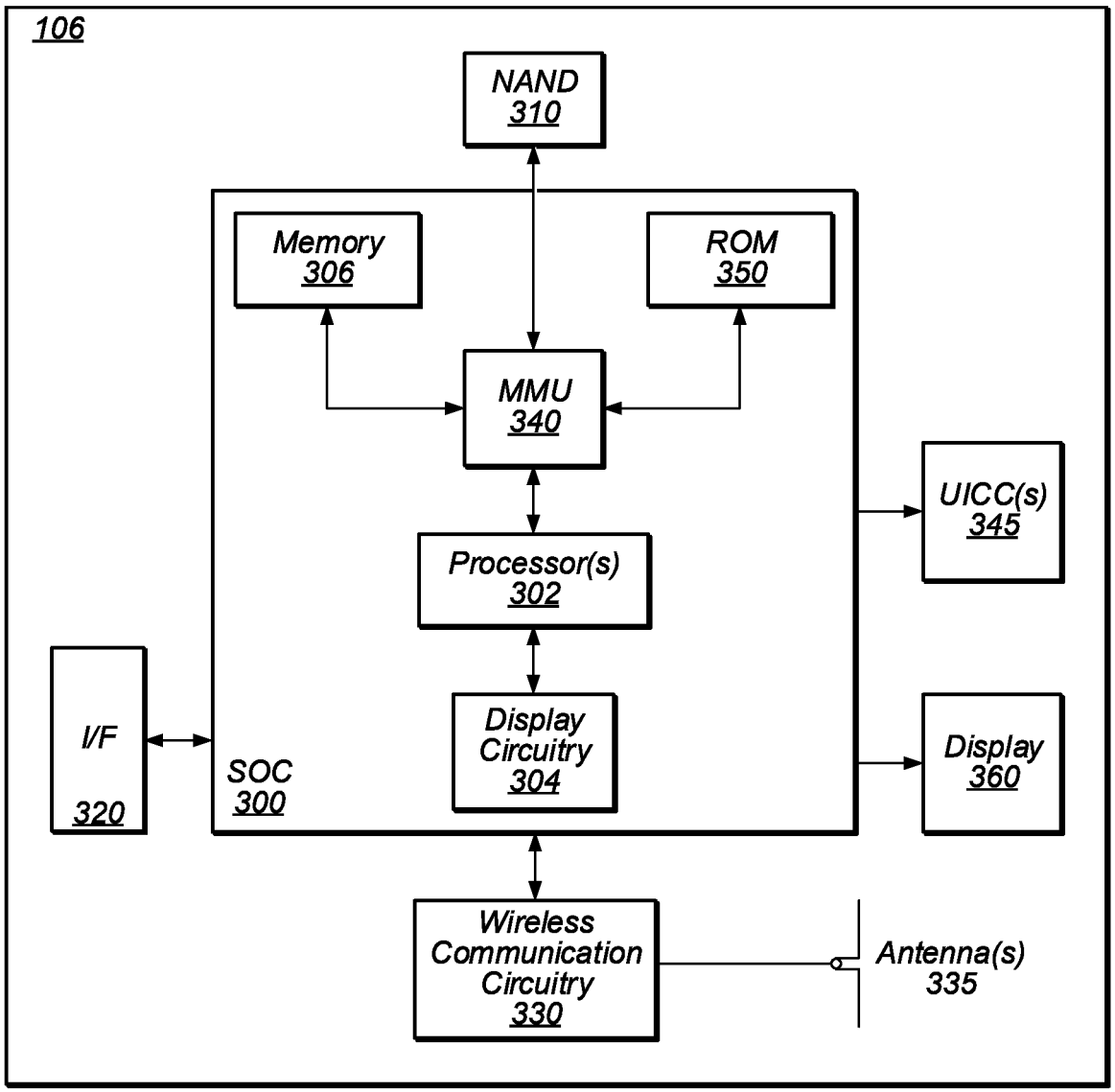
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
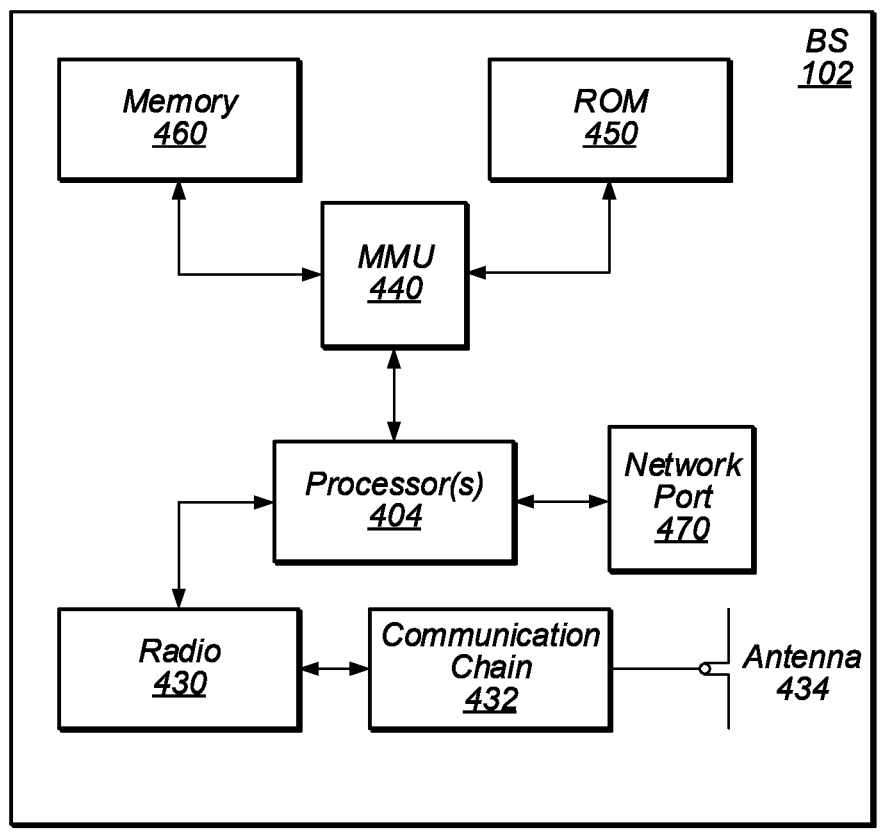
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
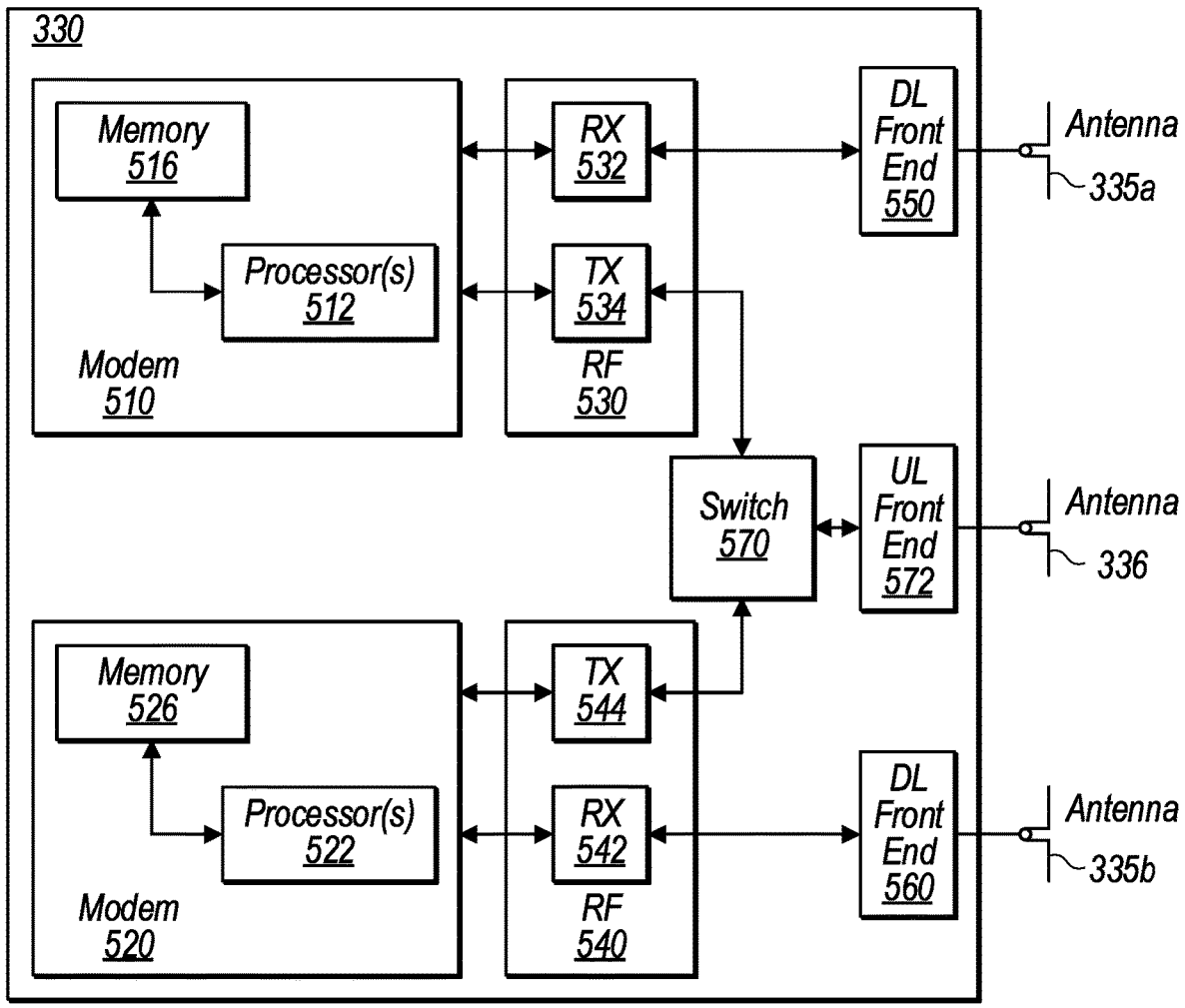
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
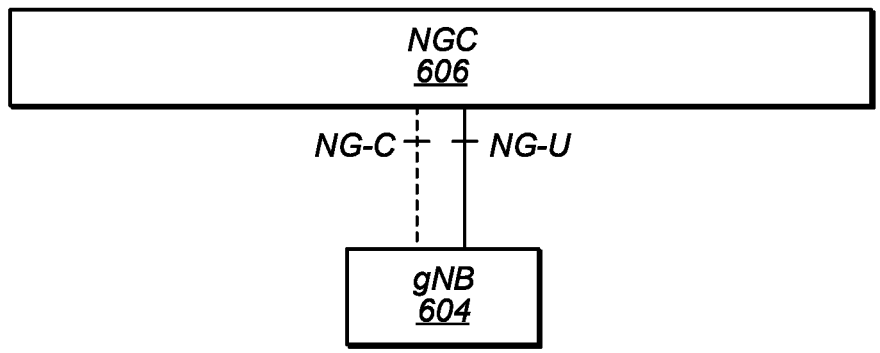
FIGS. 6 and 7 illustrate examples of a 5G NR base station (gNB), according to some embodiments.
Figure 7:
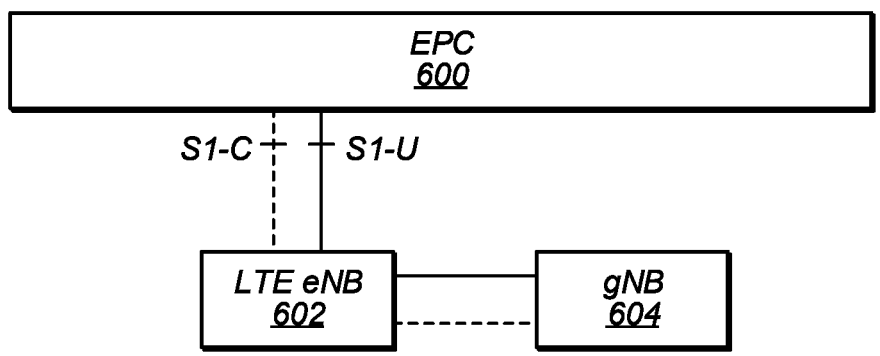

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Communication Coordination and Power Saving Techniques for Multi-Subscriber Identity Module Devices In some embodiments, the UE 106 may include multiple subscriber identity modules (SIMs, sometimes referred to as SIM cards). In other words, the UE 106 may be a multi-SIM (MUSIM) device, such as a dual-SIM device. Any of the various SIMs may be physical SIMs (e.g., SIM cards) or embedded (e.g., virtual) SIMs. Any combination of physical and/or virtual SIMs may be included. Each SIM may provide various services (e.g., packet switched and/or circuit switched services) to the user. In some embodiments, UE 106 may share common receive (Rx) and/or transmit (Tx) chains for multiple SIMs (e.g., UE 106 may have a dual SIM dual standby (DSDS) architecture). Other architectures are possible. For example, UE 106 may be a dual SIM dual active (DSDA) architecture, may include separate Tx and/or Rx chains for the various SIMs, may include more than two SIMs, etc.

The different identities (e.g., different SIMs) may have different identifiers, e.g., different UE identities (UE IDs). For example, an international mobile subscriber identity (IMSI) may be an identity associated with a SIM (e.g., in a MUSIM device each SIM may have its own IMSI. The IMSI may be unique. Similarly, each SIM may have its own unique international mobile equipment identity (IMEI). Thus, the IMSI and/or IMEI may be examples of possible UE IDs, however other identifiers may be used as UE ID.

The different identities may have the same or different relationships to various public land mobile networks (PLMNs). For example, a first identity may have a first home PLMN, while a second identity may have a different home PLMN. In such cases, one identity may be camped on a home network (e.g., on a cell provided by BS 102) while another identity may be roaming (e.g., while also camped on the same cell provided by BS 102, or a different cell provided by the same or different BS 102). In other circumstances, multiple identities may be concurrently home (e.g., on the same or different cells of the same or different networks) or may be concurrently roaming (e.g., on the same or different cells of the same or different networks). As will be appreciated, numerous combinations are possible. For example, two SIM subscriptions on a MUSIM device may belong to the same equivalent/carrier (e.g., AT&T/AT&T or CMCC/CMCC). As another possibility, SIM-A may be roaming into SIM-B's network (SIM-A CMCC user roaming into AT&T and SIM-B is also AT&T).

Furthermore, for a UE with a MUSIM configuration (e.g., SIM1 and SIM2) in DSDS architecture, when the UE performs an RF (radio frequency) re-tuning from SIM1 to SIM2, Tx/Rx may be suspended for SIM1. However, for UEs supporting 5G NR mmWave frequencies, a dedicated FR2 Tx/Rx RF capability may be included as hardware in the UE while some current MUSIM designs may not take full benefit of this capability. For example, a UE with a MUSIM configuration including a SIM1 with support for LTE and FR2 (mmWave) with active packet switching may be considered a data preferred or data default SIM (DDS). Additionally, in some examples, certain high-range FR1 frequencies may also use a dedicated Tx/Rx. The UE may also include a non-data or non-data default SIM (e.g., SIM2) with support for LTE but not FR2 (mmWave). Accordingly, there may exist a scenario in which the UE is operating in enhanced dual connectivity (EN-DC) mode with SIM1 active and upon SIM2 receiving or placing a voice call, SIM1 may become out of service due to the suspension of Tx/Rx on SIM1. For a UE with a MUSIM configuration in DSDA architecture, there may not be a suspension of Tx/Rx capability on both SIM1 and SIM2.

Figure 8:
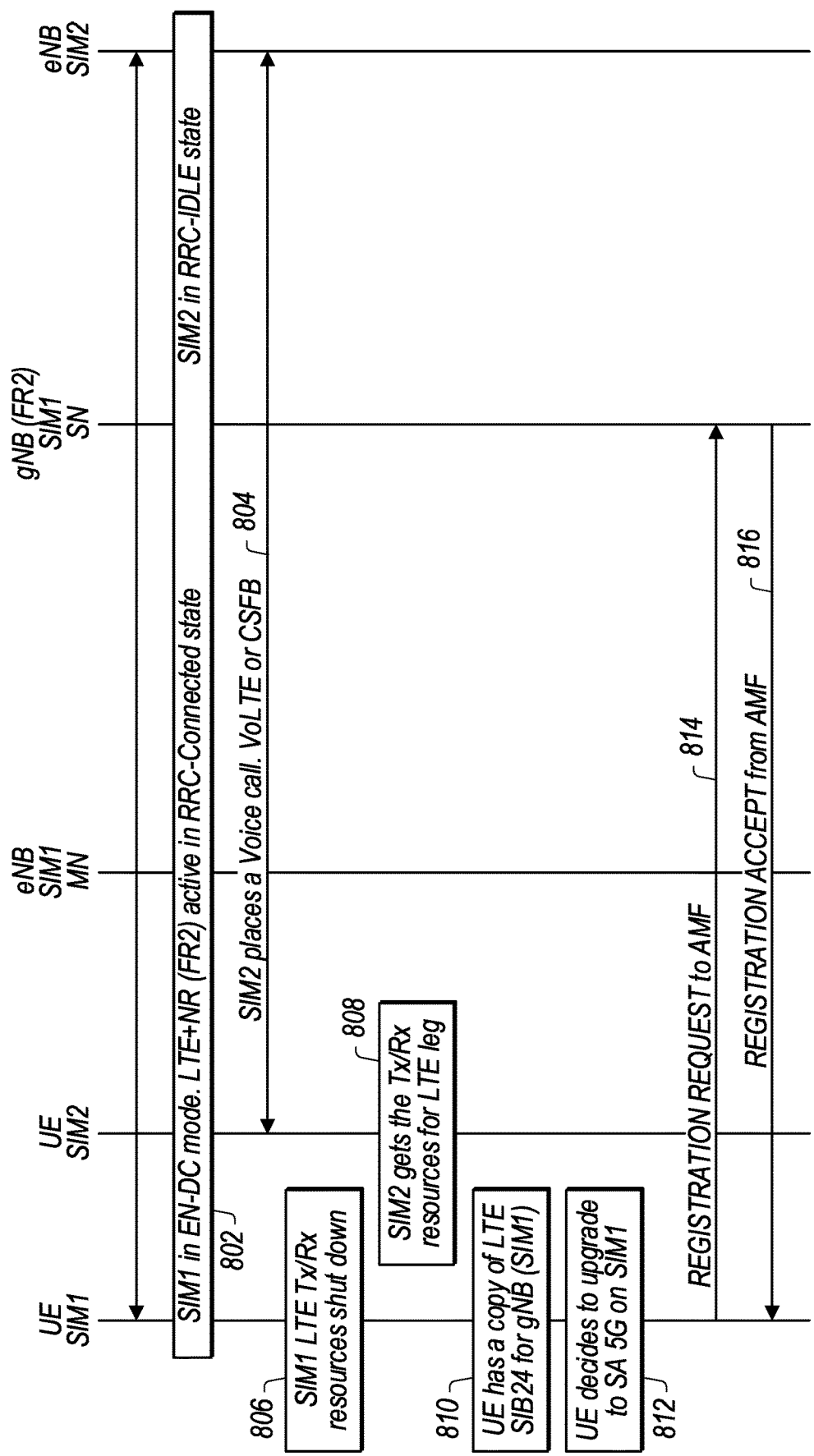
FIG. 8 is a communication flow diagram illustrating example aspects of updating a UE's configuration from NSA (non-standalone) to SA (standalone) after the UE has performed a RF re-tuning, according to some embodiments.

FIG. 8—NSA to SA Configuration Update After RF Tune Away

FIG. 8 is a communication flow diagram illustrating example aspects of updating a UE's configuration from NSA (non-standalone) to SA (standalone) after the UE has performed a RF re-tuning as described above (e.g., from SIM1 to SIM2).

More specifically, in 802, SIM1 may be operating in EN-DC mode, be in an RRC-Connected state and may further support LTE and NR (FR2) in a DDS role. In other words, SIM1 may be communicating with a NR supported base station (e.g., gNB (FR2)) in addition to an LTE supported base station (e.g., eNB). Additionally, or alternatively SIM2 may take on a non-data default (nDDS) role through communicating with the LTE supported eNB (and not the gNB) and may further be in an RRC-IDLE state. In 804, SIM2 may place a voice call using voice over LTE (VoLTE) or via circuit-switched fallback.

Next, in 806, SIM1 may disable its LTE Tx/Rx resources in response to SIM2 placing the voice call. Accordingly, SIM2 may then utilize said SIM1 disabled resources for use in its LTE communications with the eNB (e.g., the voice call). Additionally, or alternatively in 810 the UE (e.g., SIM1) may utilize a copy of a LTE system information block (SIB) (e.g., SIB24) corresponding to the gNB and may further decide in 812 to upgrade its configuration from a NSA to a SA signaling gateway (SG) associated with the gNB. Correspondingly, the UE (e.g., SIM1) may then in 814 transmit a REGISTRATION REQUEST message to the 5G Core Access and Mobility Management Function (AMF) corresponding to the gNB and further receive a REGISTRATION ACCEPT message from the AMF of the gNB in 816. In other words, 802-816 describe an example scenario in which SIM1 may utilize a NR Tx/Rx path to inform the network of its LTE unavailability and may alter its configuration for simultaneous data transfer over a NR link in SIM1 while a voice call is active on SIM2, according to some embodiments.

Figure 9:
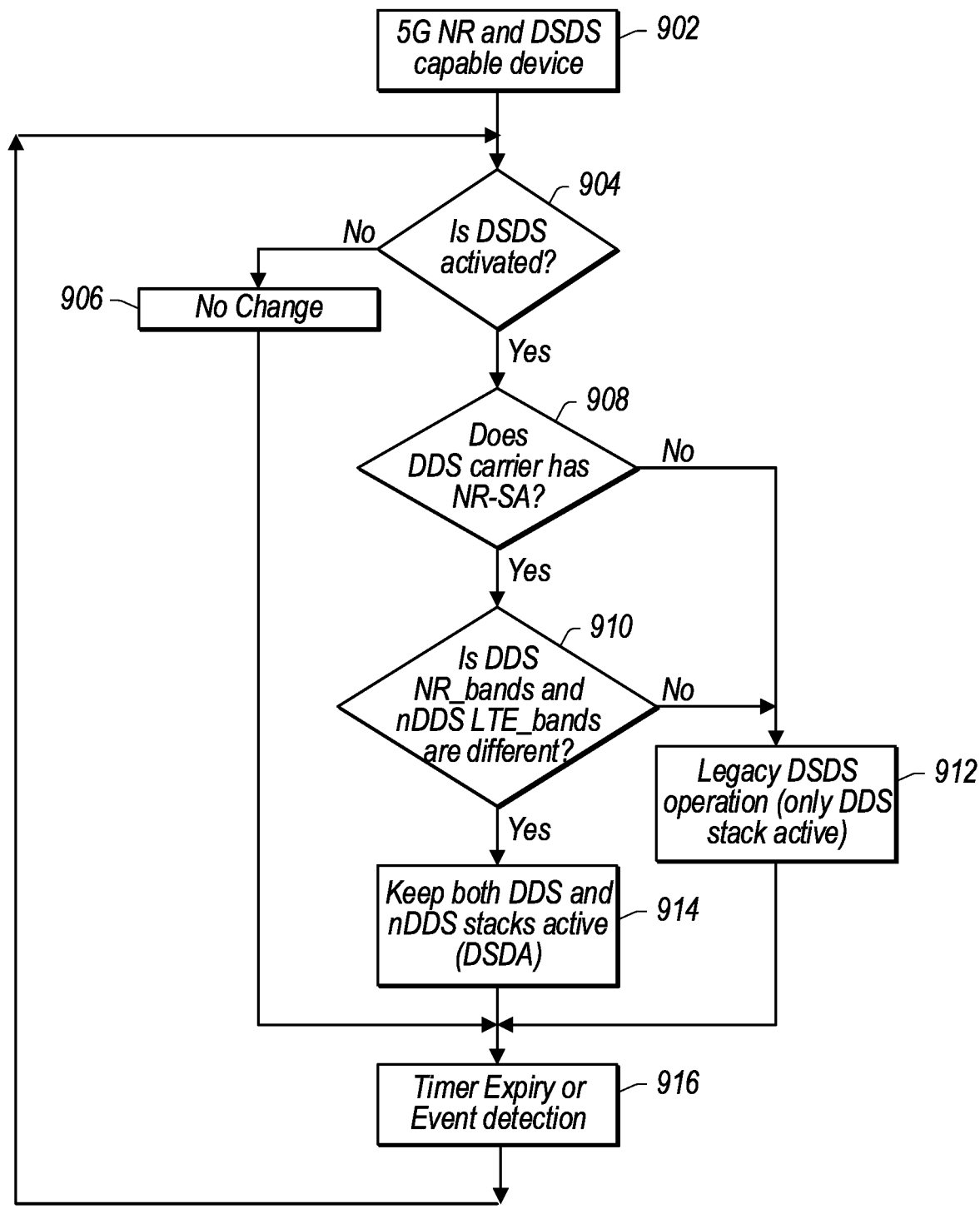
FIG. 9 is a flow diagram illustrating example aspects of a method for updating a UE's configuration from DSDS to DSDA in order to gain active access on both SIMs at the same time when one of the SIMs is actively communicating on NR-SA and when RF front-end paths are different, according to some embodiments.

FIG. 9—Method for Updating a UE's Configuration from DSDS to DSDA

In case of some multi-SIM cellular devices, Dual SIM Dual Standby (DSDS) may be the more widely adopted technology. In particular, while utilizing DSDS, both SIMs may be active when the cellular connection for both SIMs is in "RRC-Idle" mode. Conversely, in the scenario of connected mode (e.g., RRC-Connected) DSDS operation, only one SIM may have an active connection with the network due to the fact that many cellular devices only have one modem to support both SIMs. In other words, SIM2 may be "out of service" when there is an active call on SIM1 or vice-versa. Moreover, cellular devices that support NR-NSA (non-standalone) and NR-SA (standalone), the UE may be capable of processing signals originating from both technologies at the same time (e.g., simultaneously).

FIG. 9 is a flow diagram illustrating example aspects of a method for updating a UE's configuration from DSDS to DSDA in order to gain active access on both SIMs at the same time when one of the SIMs is actively communicating on NR-SA. (e.g., when RF front-end paths are different). For example, a 5G NR UE or wireless device capable of supporting DSDS in 902 may determine if DSDS is active in 904. Accordingly, if DSDS is not active, the UE may proceed from 904 through 906 without change to proceed to 916 in which a timer may expire or an event may be detected in order to restart the flow diagram at 904.

Additionally, or alternatively if DSDS is activated in 904, the UE may proceed to 908 in which the UE further determines if the DDS carrier supports a NR-SA configuration. If not, the UE may proceed to use legacy DSDS operations in 912 and further continue to 916. For example, in connected mode DSDS operation, the UE may only have one SIM with an active connection to the network while the other SIM may be out of service. This legacy mode DSDS operation may be caused by the fact that some cellular devices may only have one modem to support both SIMs. In other words, the UE may only be able to keep the DDS stack active. However, if the DDS carrier does support a NR-SA configuration, the UE may proceed to 910 in which the UE further determines if the DDS NR bands and nDDS LTE bands are different. If the DDS NR bands and nDDS LTE bands are different, the UE may keep both DDS and nDDS protocol stacks active in 914, but otherwise may proceed to 912. Finally, the UE may proceed to 916 and ultimately restart the process again at 904 upon expiry of a timer or detection of a particular event.

FIG. 10—5G NSA DSDS Implementation SDM Solutions for MUSIM

In some embodiments, a UE supporting MUSIM and including SIM1 and SIM2 may further have NR enabled for both SIMs. However, in the NSA configuration, the subscriber data management (SDM) of the UE may be utilized to disable NR measurements on a dormant SIM in order to conserve battery power.

Figure 10B:
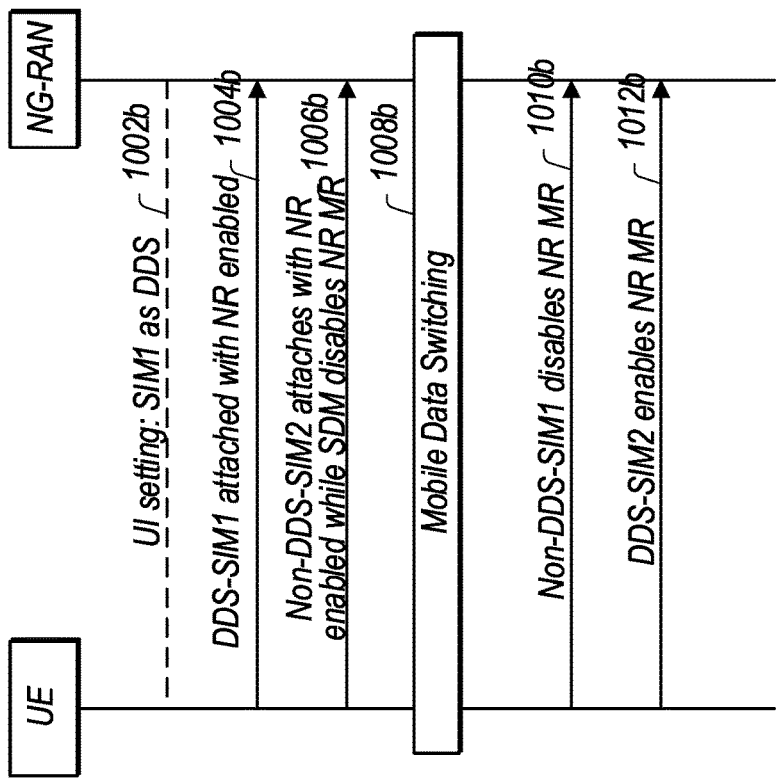
FIGS. 10a and 10b respectively illustrate example communication flow diagrams in which 5G (e.g., NR) Mobile Data Switching is not supported and in which 5G (e.g., NR) Mobile Data Switching is supported, according to some embodiments.
Figure 10A:
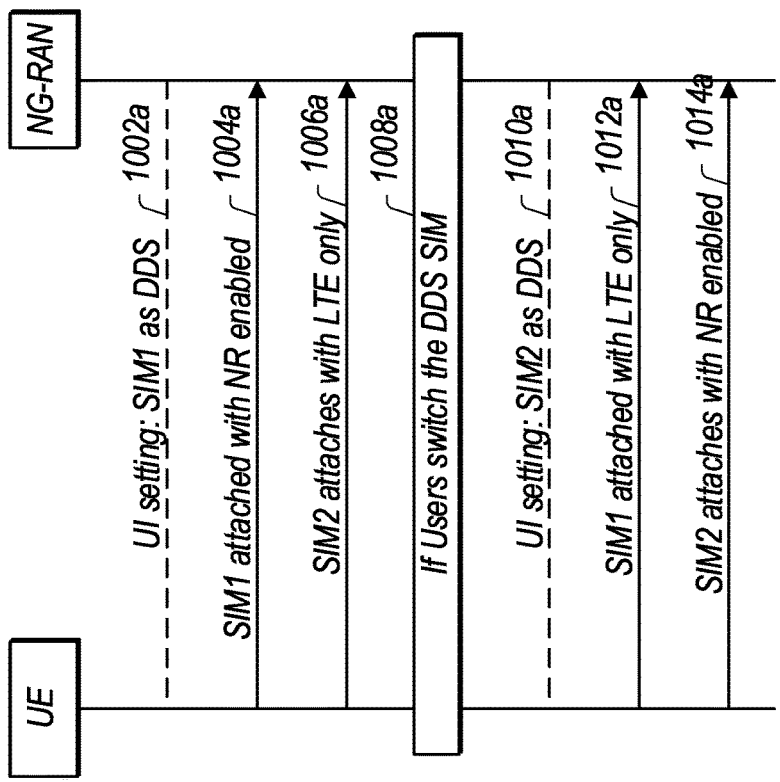

FIG. 10a illustrates an example communication flow diagram in which 5G (e.g., NR) Mobile Data Switching is not supported. More specifically, FIG. 10a illustrates the user initiated switching of the UI setting of one or more SIMs (e.g., SIM1 and SIM2) from DDS to nDDS or vice versa. For example, in 1002a the UE may have a UI setting with SIM1 configured as DDS. Consequently, in 1004a, SIM1 may attached to the NG-RAN with NR enabled. However, as a nDDS, SIM2 may only attach to the NG-RAN with LTE as seen in 1006a. However, if the user switches the UI setting of SIM2 to DDS as shown in 1008a and 1010a, the SIMs may essentially reverse roles with regard to how they connect to the NG-RAN. In other words and as shown in 1012a, since SIM2 has been switched to DDS by the user, SIM1 may only attach to the NG-RAN using LTE and SIM2 may attach to the NG-RAN with NR enabled as shown in 1014a. However, the nDDS SIMs attached to the NG-RAN may still be consuming power through NR measurement reports (MRs). Additionally, or alternatively in some embodiments the example above in regard to FIG. 10a may be extended to support a UE that may attach to a 4G-RAN (e.g., LTE) and also include a NSA capability which is enabled and disabled in SIM1 and SIM2 respectively.

In a different embodiment, FIG. 10b illustrates an example communication flow diagram in which 5G (e.g., NR) Mobile Data Switching is supported. More specifically, FIG. 10b illustrates the implementation of said switching for a UE in utilizing a NSA DSDS configuration. For example, as shown in 1002b, a UE communicating with a next-generation-random access network (NG-RAN) may have a user interface (UI) setting in which SIM1 has been designated as DDS. Accordingly, in 1004b the DDS SIM1 may attach to the NG-RAN if NR is enabled. In 1006b, the nDDS SIM2 may also attach to the NG-RAN due to NR being enabled. Additionally, or alternatively in 1006b the SDM may also disable NR measurement reports (MR) for SIM2.

In 1008b, the UE may utilize its supported Mobile Data Switching capability in order to reconfigure SIM1 and SIM2 and their DDS and/or nDDS configurations. In other words, as shown in 1010b, the UE may utilize said Mobile Data Switching capability to reconfigure SIM1 to be a nDDS rather than its previous configuration as a DDS and reconfigure SIM2 to be a DDS rather than its previous configuration as a nDDS. Additionally, or alternatively in 1010b the UE may disable NR MR for the nDDS SIM1. This may provide some power conservation benefits to the UE by reducing 5G communications (e.g., measurement reports) with the NG-RAN. Next, in 101b2, having reconfigured SIM2 as a DDS, the UE may then re-enable NR MR for SIM2. Accordingly, the UE may then begin to communicate and benefit from measurement reports from the NG-RAN.

Figure 11:
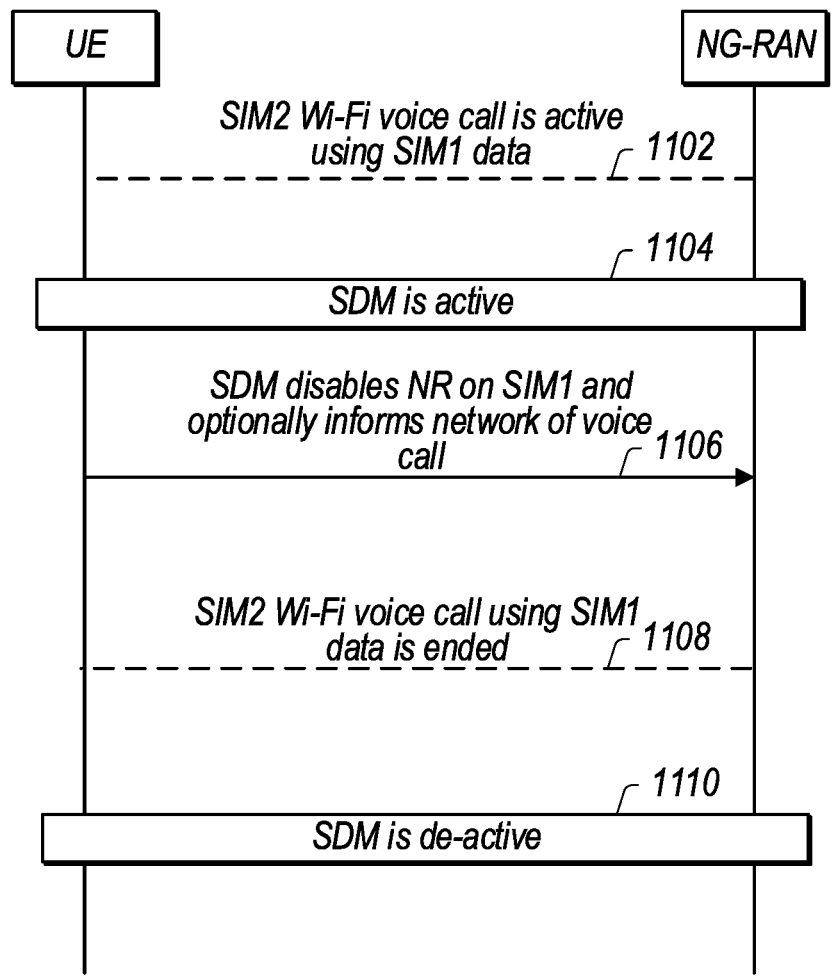
FIG. 11 illustrates an example solution for 5G NSA DSDA implementation via use of the SDM, according to some embodiments.

FIG. 11—5G NSA DSDA Implementation SDM Solutions for MUSIM

In some embodiments, a UE supporting MUSIM and including a first SIM (e.g., SIM1) and a second SIM (e.g., SIM2) may further be utilizing a NSA DSDA configuration. In other words, the UE may be able to support active DDS and nDDS stacks at the same time. More specifically, in some embodiments, SIM2 may be using SIM1 data to support a voice call via Wi-Fi. Accordingly, improvements in regard to battery conservation may be desired for the aforementioned configuration.

For example, as shown in FIG. 11, in 1102 SIM2 may be supporting a Wi-Fi voice call through use of SIM1's NR data due to SIM2 being out of service. In 1104, the UE may support a NSA DSDA configuration in which the SDM is active and may further disable NR on SIM1 in order to conserve battery power in 1106. Additionally, or alternatively in 1106, the UE may trigger semi-persistent scheduling for the NSA SIM1 due to the disabled NR and may further notify the network (e.g., NG-RAN) that a voice call is being performed. Accordingly, in 1108, once the SIM2 Wi-Fi voice call using SIM1's data has ended, the SDM may be de-activated in 1110.

Figure 12:
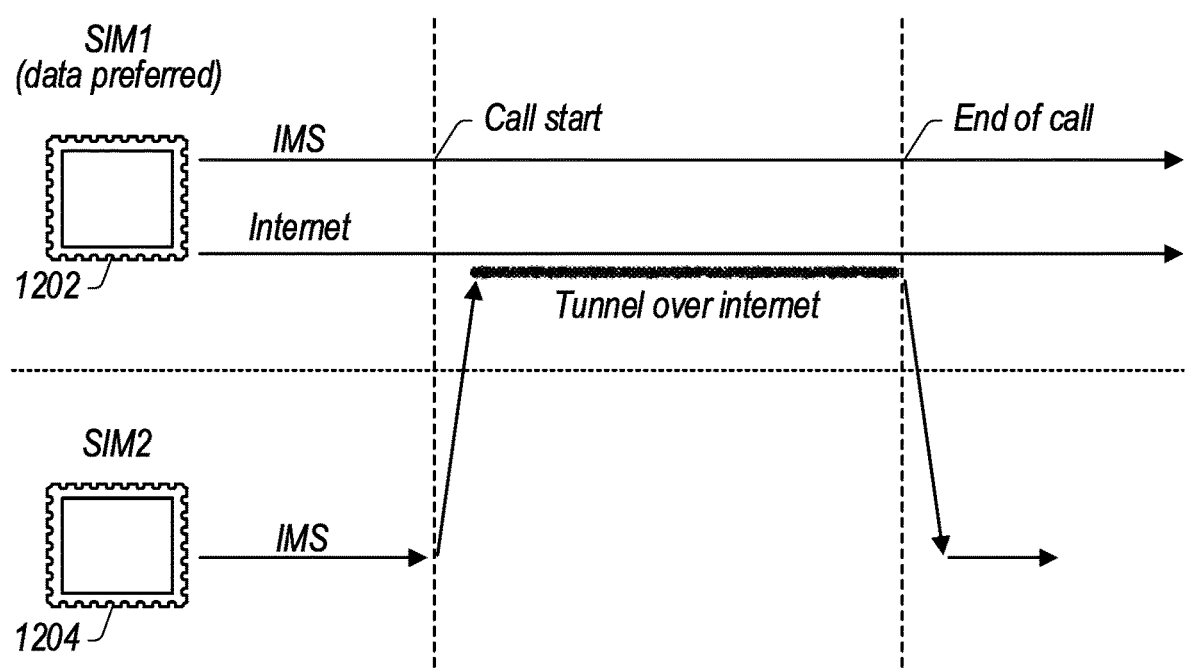
FIG. 12 illustrates an example solution for a data preferred SIM call, according to some embodiments.
Figure 13:
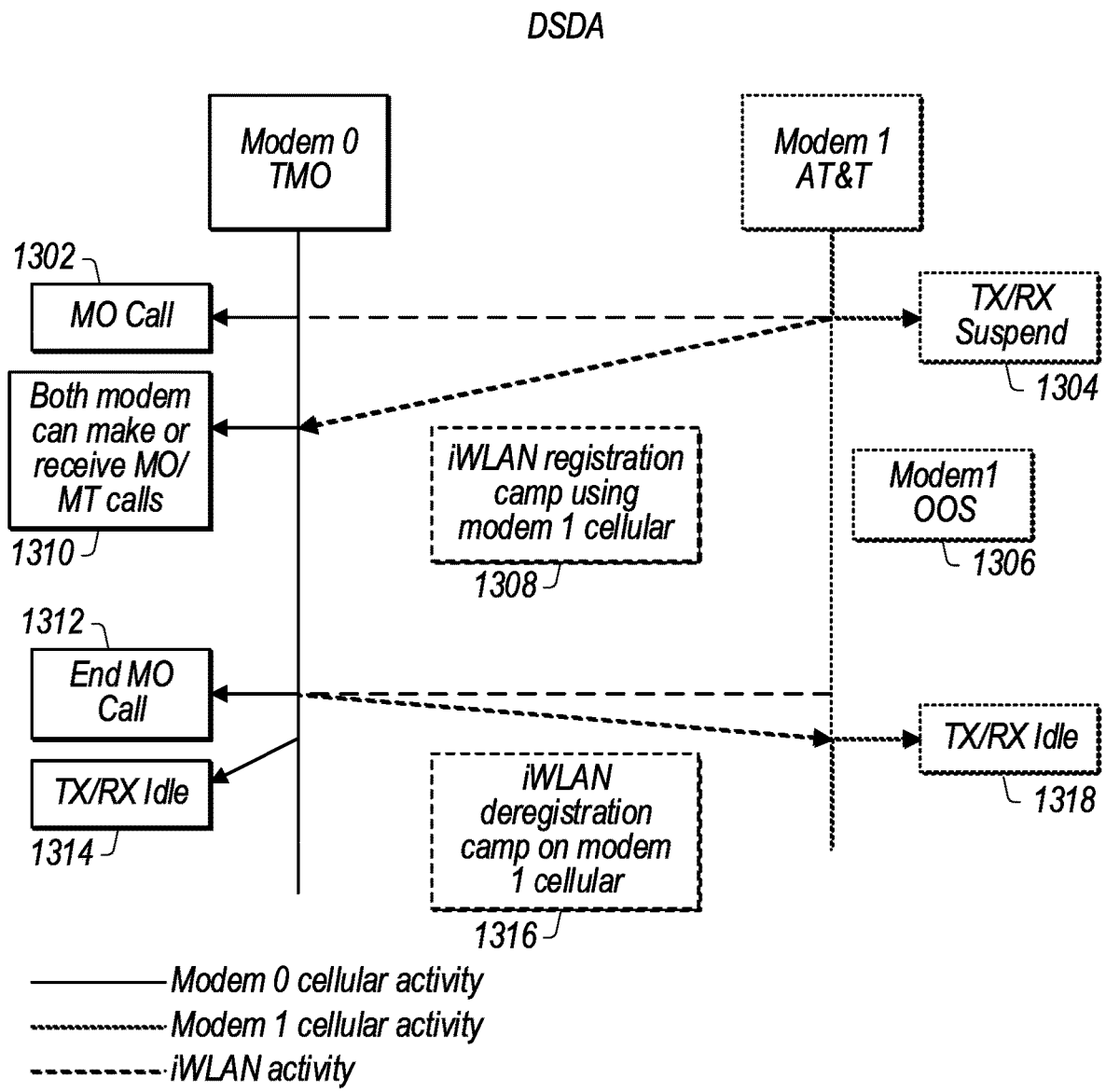
FIG. 13 illustrates an example of cellular and iWLAN activity of a UE with two modems and a DSDA configuration, according to some embodiments.

FIGS. 12 and 13—IMS and iWLAN Assisted SIM Calling

FIG. 12 illustrates an example solution for a data preferred SIM call. More specifically, for a UE supporting MUSIM and including one or more SIMs, a first SIM (SIM1) 1202 may be configured as a data preferred SIM (e.g., DDS) while a second SIM (SIM2) 1204 may be configured as an nDDS. In some embodiments, SIM1 may be supporting a Wi-Fi voice call through use of an IP multimedia subsystem (IMS) and may further utilize SIM2's IMS capability via tunnel over internet to provide data support to SIM1 while SIM1 maintains said IMS supported Wi-Fi call. In other words, a UE may be configured to draw additional data support from an nDDS while supporting a Wi-Fi call via IMS while simultaneously utilizing data for other purposes involving the internet (e.g., downloading files from a browser).

FIG. 13 illustrates an example of cellular and iWLAN activity related to a UE with two modems and a DSDA configuration, according to some embodiments. For example, in 1302, a mobile originated (MO) call may be placed or be active through use of Modem 0 (TMO). Additionally, the TX/RX capability of Modem 1 (AT&T) may be suspended as shown in 1304 due to Modem 1 being out of service (OOS) in 1306. Correspondingly, in 1308, the UE may perform an iWLAN registration procedure in order to support the call and camp using modem 1 cellular data. In other words, the UE with a first SIM (SIM1) utilizing Modem 1 may suspend its Tx/Rx resources and further utilize its iWLAN capability to support a second SIM (SIM2) with an active Wi-Fi call (e.g., the Modem 0 MO call). Additionally, by utilizing this iWLAN capability, both modems may be able to make or receive MO or mobile terminated (MT) calls as shown in 1310. In other words, due to the fact that Modem 1 and Modem 0 may have a different phone numbers with which to receive calls, a user with a mobile device in the shown configuration may wish to maintain a call using the particular Modem 0 phone number through use of iWLAN registration using Modem 1 cellular data to support said call.

Once the MO call has ended in 1312 and Modem 0's TX/RX resources become idle in 1314, the UE may deregister the iWLAN camp on Modem 1's cellular data shown by 1316 may in turn further cause Modem 1's Tx/Rx resources to become idle as shown by 1318.

Figure 14:
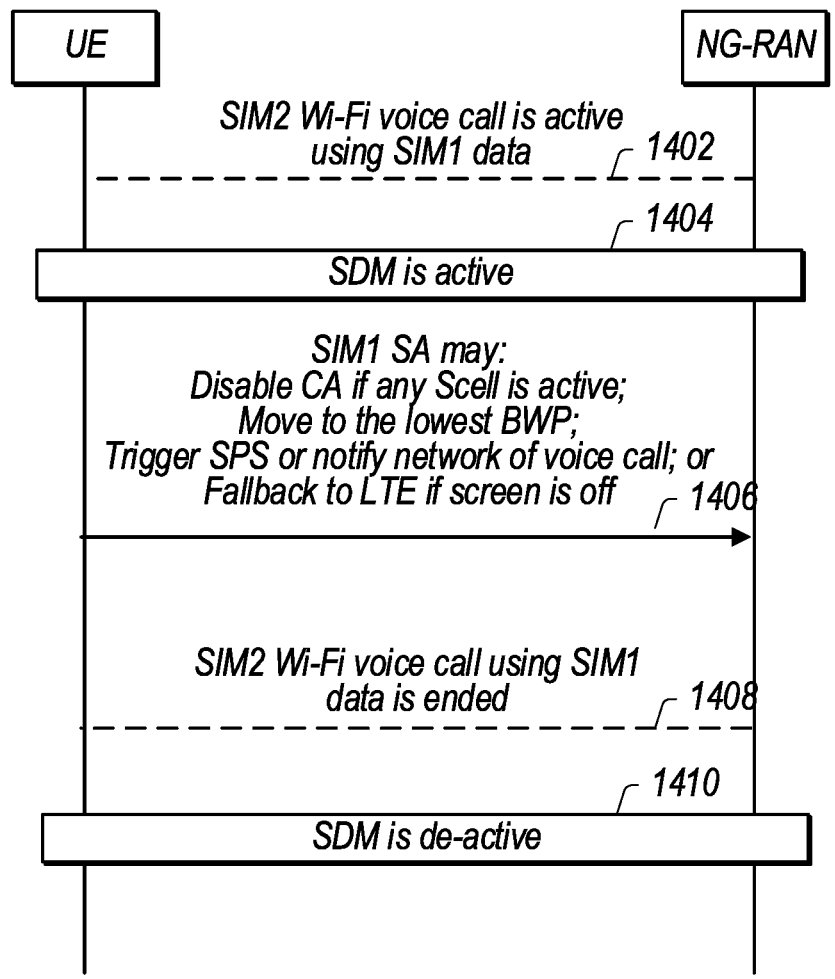
FIG. 14 illustrates an example solution for 5G SA DSDA configured UEs when SIM2 is using SIM1's data for a voice call, according to some embodiments.

FIG. 14—5G SA DSDA When SIM 2 using Sim1 Data for Voice Call (SIM 2 No Service)

In some embodiments, a UE may support MUSIM as well as a SA DSDA configuration in which the UE's first SIM's (SIM1) data is in connected mode and is being used by the UE's second SIM (SIM2) due to SIM2 being out of service while supporting a Wi-Fi voice call. Accordingly, the UE may be able to implement certain solutions in order to conserve battery consumption in the aforementioned scenario.

For example, as shown in FIG. 14, in 1402 SIM2 may be supporting a Wi-Fi voice call through use of SIM1's data due to SIM2 being out of service. In 1404, the UE may support a SA DSDA configuration in which the SDM is active. In 1406, the SIM1 SA may disable carrier aggregation (CA) if any secondary cell (Scell) is active, according to some embodiments. In some embodiments, the SIM1 SA may transition to the lowest bandwidth part (BWP) as part of 1406. Additionally, or alternatively in 1406 the SIM1 SA may trigger semi-persistent scheduling and may further notify the network (e.g., NG-RAN) that data for the voice call is being utilized. In some embodiments, in 1406 the SIM1 SA may also perform a fallback procedure to use LTE data if the screen is off. Accordingly, in 1408, once the SIM2 Wi-Fi voice call using SIM1's data has ended, the SDM may be de-activated in 1410.

Figure 15:
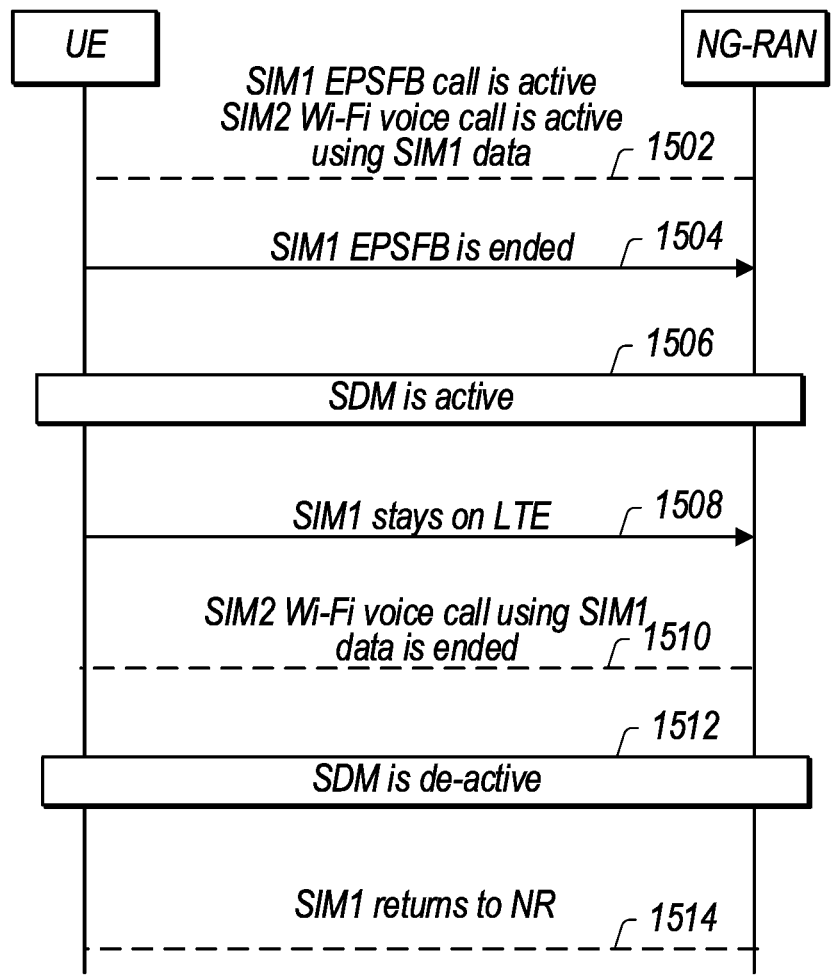
FIG. 15 illustrates an example solution for 5G SA DSDA configured UEs when SIM2 is using SIM1's data for a voice call and while SIM1 is coordinating a EPSFB call, according to some embodiments.

FIG. 15—SA DSDA When SIM2 is Using SIM1 Data for Voice Call (SIM1 is EPSFB Call)

In some embodiments, a UE may support MUSIM as well as a SA DSDA configuration in which the UE's first SIM's (SIM1) data is supporting an Evolved Packet System Fallback (EPSFB) call in addition to SIM1's data also being used by the UE's second SIM (SIM2) due to SIM2 being out of service while supporting a Wi-Fi voice call. Accordingly, the UE may be able to implement certain solutions in order to conserve battery consumption in the aforementioned scenario.

For example, as shown in 1502 of FIG. 15, a UE's SIM1 may be supporting an active EPSFB call while SIM2 is using SIM1 data for a Wi-Fi voice call. However, even after the EPSFB call of SIM1 is ended in 1504 and the SDM becomes active in 1506, the SIM1 may remain on LTE in 1508. In other words, when the SIM1 call has ended, the SDM may become active while the SIM1 keeps camping on LTE rather than immediately returning to NR. Accordingly, once the SIM2 Wi-Fi voice call using the data of SIM1 has ended in 1510, the SDM may become inactive in 1512 and SIM1 may further reestablish its NR connection from its current LTE connection in 1514.

Figure 16:
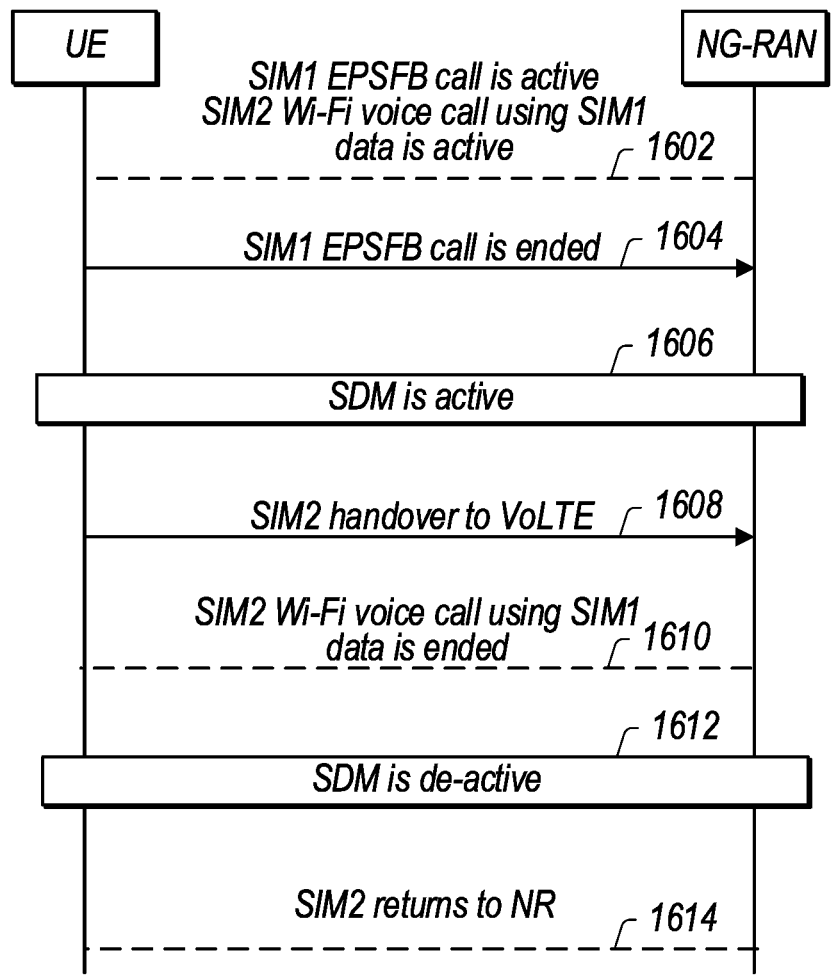
FIG. 16 illustrates an example handover to VoLTE solution for 5G SA DSDA configured UEs when SIM2 is using SIM1's data for a voice call and while SIM1 is coordinating a EPSFB call, according to some embodiments.

FIG. 16—SIM2 HO to VoLTE

In some embodiments and as shown in FIG. 16, in 1602 a UE's SIM1 may be supporting an active NR or EPSFB call while SIM2 is using SIM1 data for a Wi-Fi voice call. However, after the NR or EPSFB call of SIM1 is ended in 1604 and the SDM becomes active in 1606, the SIM2 Wi-Fi voice call may be handed over to voice over LTE (VoLTE). In other words, when the SIM1 EPSFB call has ended, the SDM may become active and the UE may initiate a handover such that the SIM2 Wi-Fi voice call is transferred to VoLTE rather than immediately reestablishing its NR connection to complete the call using voice over NR (VoNR). Accordingly, once the SIM2 Wi-Fi VoLTE call has ended in 1610, the SDM may become inactive in 1612 and SIM1 may further reestablish its NR connection from its current LTE connection in 1614.

EN-DC DSDS

In some embodiments, a UE operating in enhanced dual connectivity (EN-DC) and supporting a dual SIM-dual standby (DSDS) configuration may include a first SIM (SIM1) that further supports frequency range 2 (FR2) communications on the NR leg. Furthermore, if a second SIM (SIM2) of the UE receives a voice call, the first SIM (SIM1) may inform the NR supporting base station (e.g., gNB) via a MAC control element, UCI or via the SRB3 interface that the LTE communication link between the SIM1 and eNB may be suspended for "x" seconds. The NR supporting base station (e.g., gNB) may send a SGNB MODIFICATION REQUIRED message to the LTE supporting base station (e.g., eNB). This SGNB MODIFICATION REQUIRED message may further include information elements (IEs) related to parameters or values used to inform the eNB to not de-register the UE, but rather maintain the context or connection for a certain time period "x". For example, in some embodiments, if the UE returns to service within the indicated time period "x", the UE context may be restored in LTE. Additionally, or alternatively if the UE does not return to service within "x", the NR-leg may be released. Furthermore, the gNB may have the capability to extend the time period "x", according to some embodiments.

According to some embodiments, a UE operating in a similar EN-DC and DSDS configuration in which the UE includes a first SIM (SIM1) that further supports frequency range 2 (FR2) communications on the NR leg and a second SIM (SIM2) of the UE receives a voice call, the first SIM (SIM1) may inform the NR supporting base station (e.g., gNB) via a MAC control element, UCI, or via the SRB3 interface that the LTE communication link between SIM1 and eNB may be suspended for "x" seconds. The SIM1 network gNB may send a SGNB MODIFICATION REQUIRED message to the SIM1 eNB. Furthermore, this SGNB MODIFICATION REQUIRED message may include IEs which may indicate or inform the eNB to not drop the UE's master node (MN) context, but rather maintain the MN context in a suspended state for a certain time period "x". In some embodiments, this suspended state may be similar to the RRC Inactive state. Additionally, or alternatively the SIM1 eNB may send a SGNB MODIFICATION CONFIRM message to the gNB in response to receiving the SGNB MODIFICATION REQUIRED message.

For example, in some embodiments, if the UE returns to service within the indicated time period "x", the UE context may be restored in LTE. Additionally, or alternatively if the UE does not return to service within the time period "x", the NR-leg may be released by the UE. Moreover, the value or parameter "x" may be either provided by the UE, or the UE may initiate a procedure for an RF tune away for a voice call or other signaling and the RAN may appropriately derive the value "x". Furthermore, the gNB or UE may have the capability to periodically extend the time period "x" based on how long the voice call on the SIM may continue, according to some embodiments. Additionally, or alternatively while the MN leg is tuned away, the wireless device (e.g., UE) may continue data transfer on SIM1's secondary cell group (SCG) over FR2.

Moreover, in some embodiments, the SGNB MODIFICATION REQUIRED message may correspond to or indicate E-UTRAN Radio Access Bearers (E-RABs) which are to be modified such that the eNB can react accordingly with regard to the maintaining the UE's context. For example, E-RAB IDs, EN-DC Resource Configurations (which may indicate the packet data convergence protocol (PDCP) and lower layer MCG or SCG configurations), CHOICE Resource Configuration, uplink configuration, or SgNB Resource Configuration Information (used to coordinate resource utilization between the en-gNB and the MeNB) may be modified to provide information to the eNB regarding the appropriate reaction regarding the UE's context. For example, the SGNB MODIFICATION REQUIRED message may include a validity timer with corresponding value "x seconds" in addition to indicating that the UE context should be retained such that the UE remains in a MM-Registered (Mobility Management-Registered) and CM-Connected (Connection Management-Connected) state.

Figure 17:
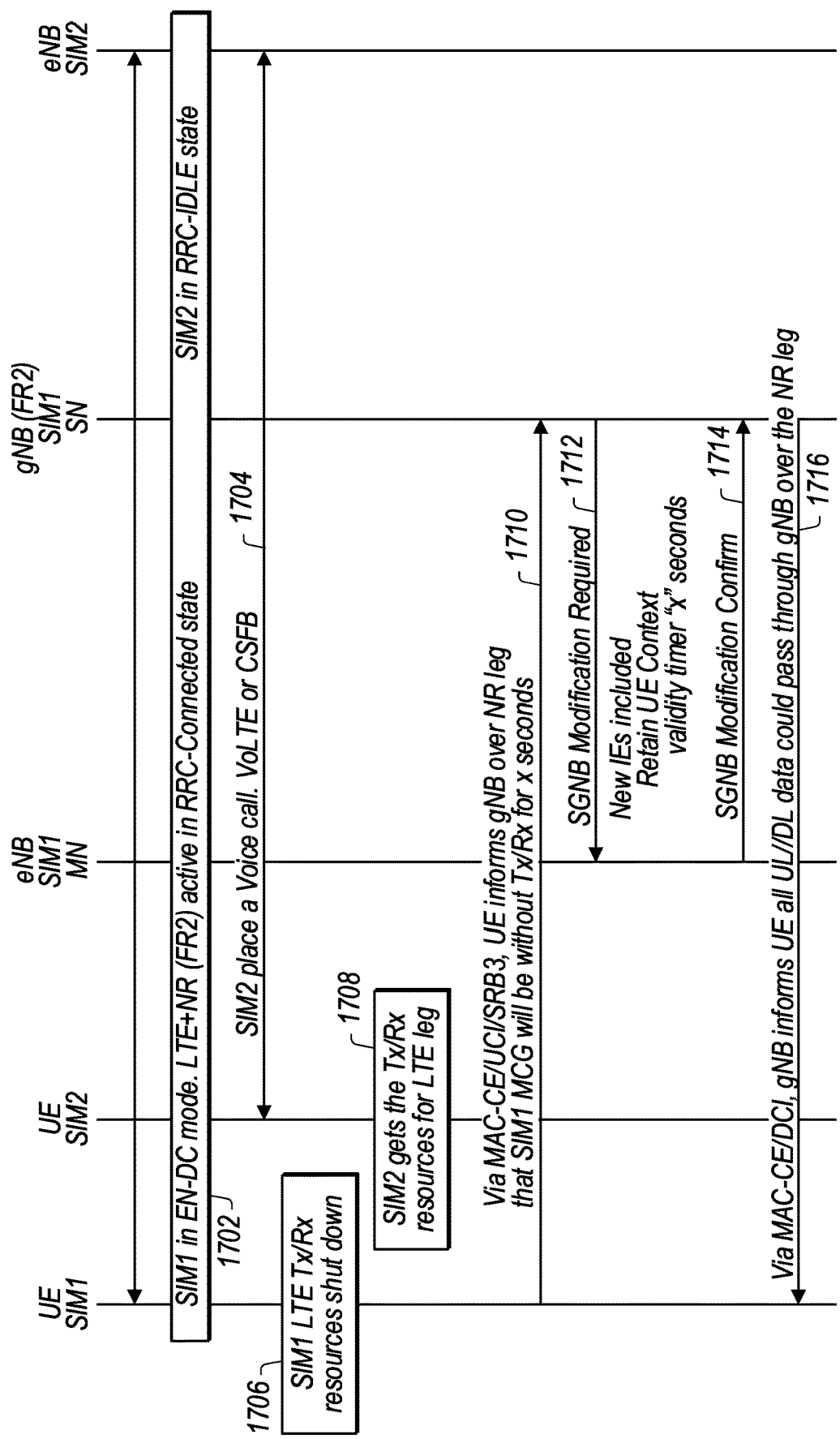
FIG. 17 illustrates an example method of how SIM1 may utilize the NR Tx/Rx path to inform the network of LTE unavailability, according to some embodiments.

FIG. 17—Utilization of NR Tx/Rx Path to Inform Network of LTE Unavailability

FIG. 17 illustrates a communication flow corresponding to a wireless device configured for EN-DC and DSDS operation. More specifically, FIG. 17 illustrates an example method of how SIM1 may utilize the NR Tx/Rx path to inform the network of LTE unavailability. This may allow for simultaneous data transfer over the NR link in SIM1 while an active voice call is being performed on SIM2.

For example, in some embodiments and as shown by 1702, the wireless device (e.g., UE) may support MUSIM and include a first SIM (SIM1) in EN-DC mode corresponding to LTE and NR (FR2) being active in an RRC-Connected state. Additionally, or alternatively in 1702 the UE's second SIM (SIM2) may be in an RRC-IDLE state and may further place a voice call using VoLTE or CSFB in 1704. Correspondingly, in 1706, SIM1's LTE Tx/Rx resources may be disabled and may further be utilized by SIM2 in its LTE leg as shown in 1708. Next in 1710, the UE may inform the gNB using the NR leg (via MAC-CE, UCI, and/or SRB3) that SIM1 MCG will be without Tx/Rx for x seconds.

In 1712, the SIM1 gNB may then transmit a SGNB Modification Required message to the SIM1 eNB which may include IEs used to indicate a validity timer of "x" seconds and that the UE context should be retained. In response, the SIM1 eNB may transmit back to the SIM1 gNB a SGNB Modification Confirm message as shown in 1714. Finally, in 1716, the gNB may inform the UE (via MAC-CE and/or DCI) that all uplink/downlink (UL/DL) data could pass through the gNB over the NR leg.

Figure 18:
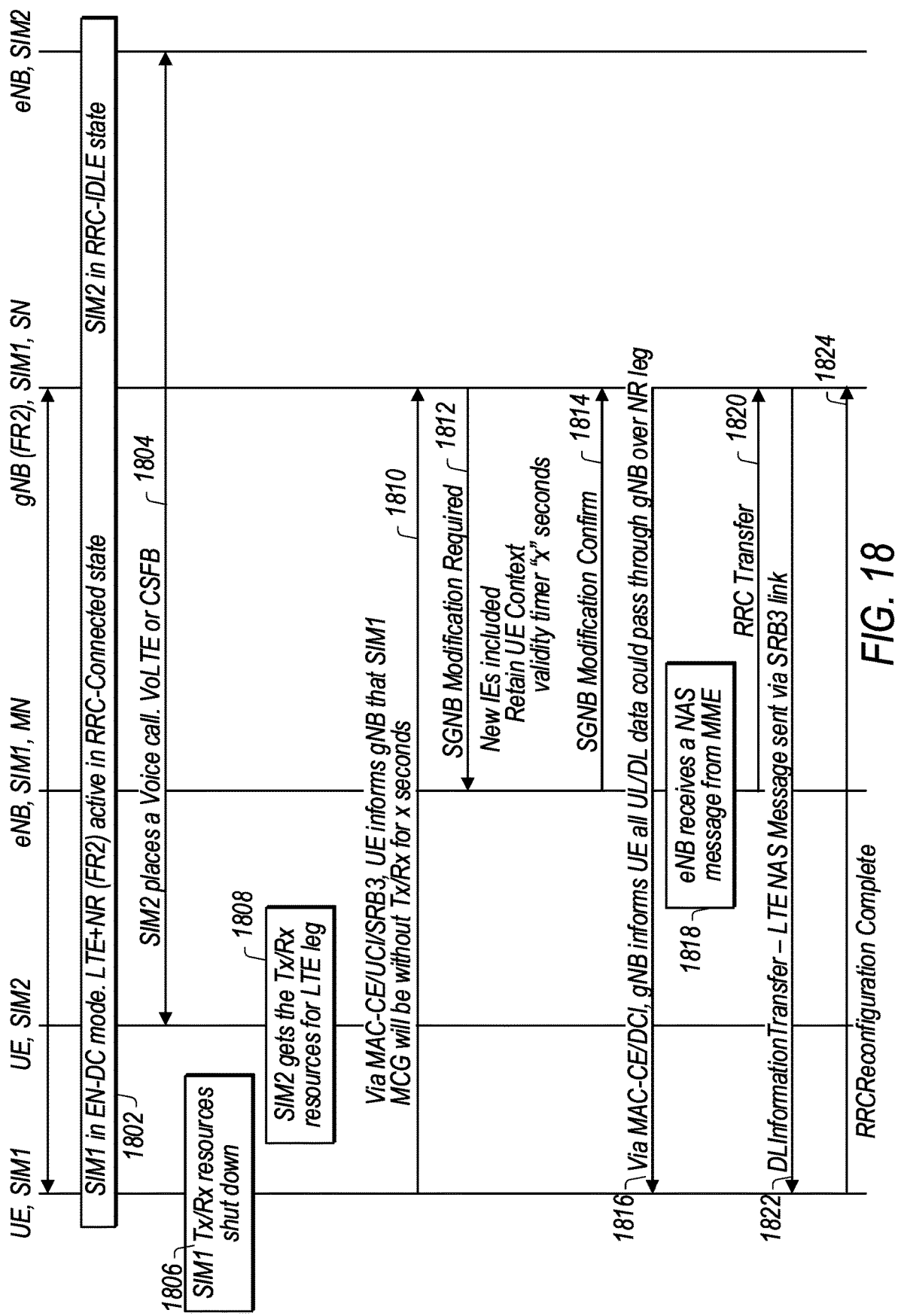
FIG. 18 illustrates an example method of how the network may initiate an RF tune away through use of piggybacking information in a NAS message, according to some embodiments.

FIG. 18—EN-DCMN(LTE) RF Tune Away+NAS Message Piggyback (NW-Initiated)

FIG. 18 illustrates a call flow corresponding to a wireless device configured for EN-DC and DSDS operation. More specifically, FIG. 18 illustrates an example method of how the network may initiate an RF tune away through use of piggybacking information in a NAS message. This may allow for simultaneous data transfer over the NR link in SIM1 while an active voice call is being performed on SIM2.

For example, in some embodiments and as shown by 1802, the wireless device (e.g., UE) may support MUSIM and include a first SIM (SIM1) in EN-DC mode corresponding to LTE and NR (FR2) being active in an RRC-Connected state. Additionally, or alternatively in 1802 the UE's second SIM (SIM2) may be in an RRC-IDLE state and may further place a voice call using VoLTE or CSFB in 1804. Correspondingly, in 1806, SIM1's Tx/Rx resources may be disabled and may further be utilized by SIM2 in its LTE leg as shown in 1808. Next in 1810, the UE may inform the gNB using the NR leg (via MAC-CE, UCI, and/or SRB3) that the SIM1 MCG will be without Tx/Rx for x seconds.

In 1812, the SIM1 gNB may then transmit a SGNB Modification Required message to the SIM1 eNB which may include IEs used to indicate a validity timer of "x" seconds and that the UE context should be retained. In response, the SIM1 eNB may transmit back to the SIM1 gNB a SGNB Modification Confirm message as shown in 1814. In 1816, the gNB may inform the UE (via MAC-CE and/or DCI) that all uplink/downlink (UL/DL) data could pass through the gNB over the NR leg.

Next, in 1818, the eNB may receive a NAS message from the mobility management entity (MME). This message may indicate to the eNB that the UE should perform an RF tune away. Correspondingly, in 1820 the SIM1 eNB may transmit an RRC Transfer message to the SIM1 gNB based on this received information in the NAS message. Furthermore, in 1822 the gNB may then "piggyback" or include with an LTE NAS message sent to the UE (via a SRB3 link, for example) a DLInformationTransfer IE to indicate that the UE should perform an RF tune away procedure. Finally, in 1824, having received the piggybacked information in the LTE NAS message from the gNB, the UE may then transmit a RRCReconfiguration Complete message to the gNB.

Figure 19:
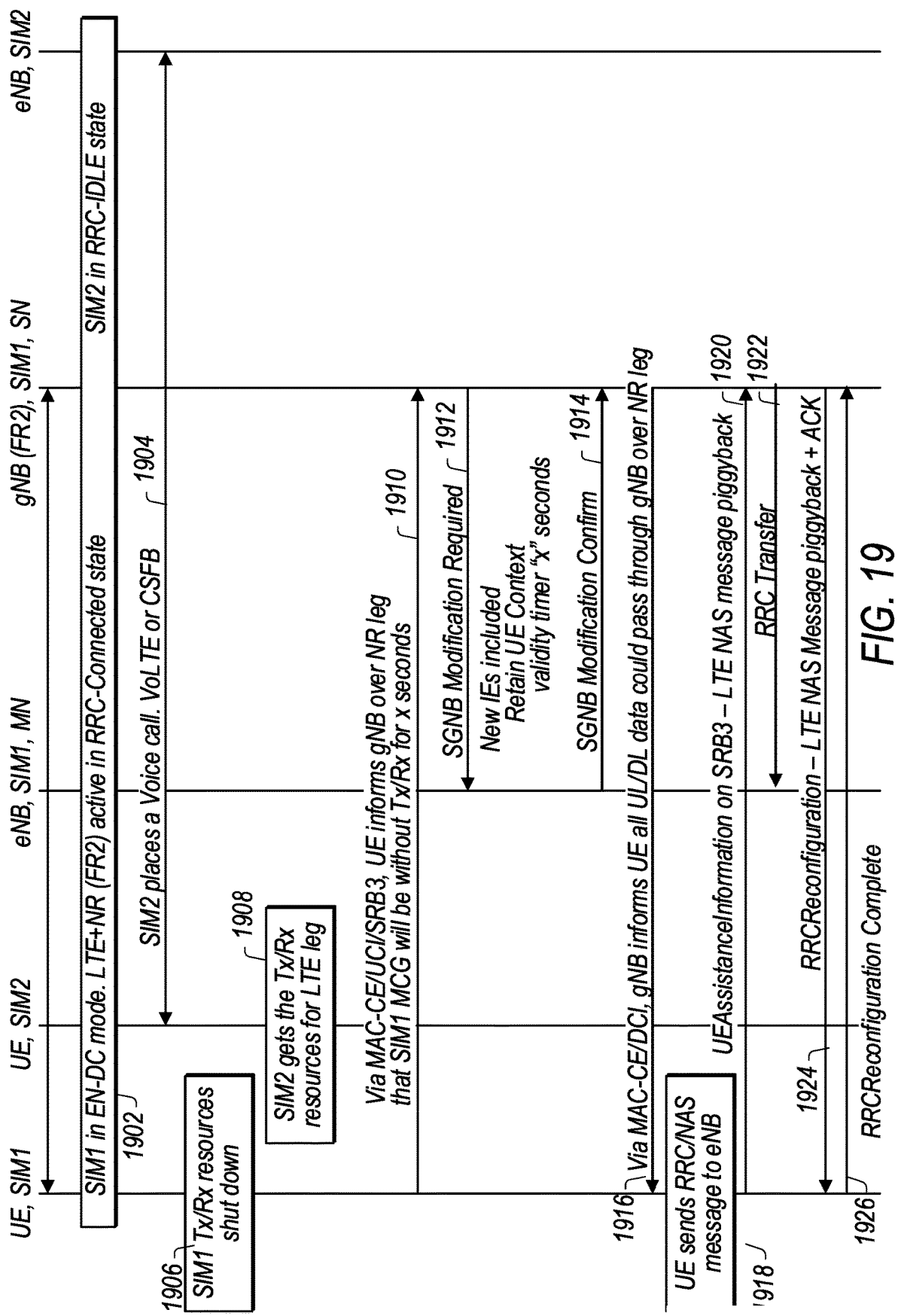
FIG. 19 illustrates an example method of how a UE may initiate an RF tune away through use of piggybacking information in a NAS message, according to some embodiments.

FIG. 19—EN-DCMN(LTE) RF Tune Away+NAS Message Piggyback (UE-Initiated)

FIG. 19 illustrates a communication flow corresponding to a wireless device configured for EN-DC and DSDS operation. More specifically, FIG. 19 illustrates an example method of how a UE may initiate an RF tune away through use of piggybacking information in a NAS message. This may allow for simultaneous data transfer over the NR link in SIM1 while an active voice call is being performed on SIM2.

For example, in some embodiments and as shown by 1902, the wireless device (e.g., UE) may support MUSIM and include a first SIM (SIM1) in EN-DC mode corresponding to LTE and NR (FR2) being active in an RRC-Connected state. Additionally, or alternatively in 1902 the UE's second SIM (SIM2) may be in an RRC-IDLE state and may further place a voice call using VoLTE or CSFB in 1904. Correspondingly, in 1906, SIM1's Tx/Rx resources may be disabled and may further be utilized by SIM2 in its LTE leg as shown in 1908. Next in 1910, the UE may inform the gNB using the NR leg (via MAC-CE, UCI, and/or SRB3) that the SIM1 MCG will be without Tx/Rx for x seconds.

In 1912, the SIM1 gNB may then transmit a SGNB Modification Required message to the SIM1 eNB which may include IEs used to indicate a validity timer of "x" seconds and that the UE context should be retained. In response, the SIM1 eNB may transmit back to the SIM1 gNB a SGNB Modification Confirm message as shown in 1914. In 1916, the gNB may inform the UE (via MAC-CE and/or DCI) that all uplink/downlink (UL/DL) data could pass through the gNB over the NR leg.

Next, in 1918, the UE may transmit a RRC/NAS message to the eNB. This message may indicate to the eNB that the UE should perform an RF tune away or may further correspond to the UE sending a short message service (SMS). Correspondingly, in 1920 the UE may transmit, to the SIM1 gNB, an UEAssistanceInformation message on SRB3 piggybacked with the LTE NAS message. Furthermore, in 1922, having received the piggybacked LTE NAS information in the UEAssistanceInformation message from the UE, the gNB may then forward the LTE NAS information via a RRC Transfer message to the eNB. Correspondingly, in 1924 the gNB may also send an RRCReconfiguration message piggybacked with the LTE NAS response message and an acknowledgement (ACK). Finally, in response to this and upon completing the RRC transfer procedure, the UE may transmit a RRCReconfiguration Complete message to the gNB in 1926.

Figure 20:
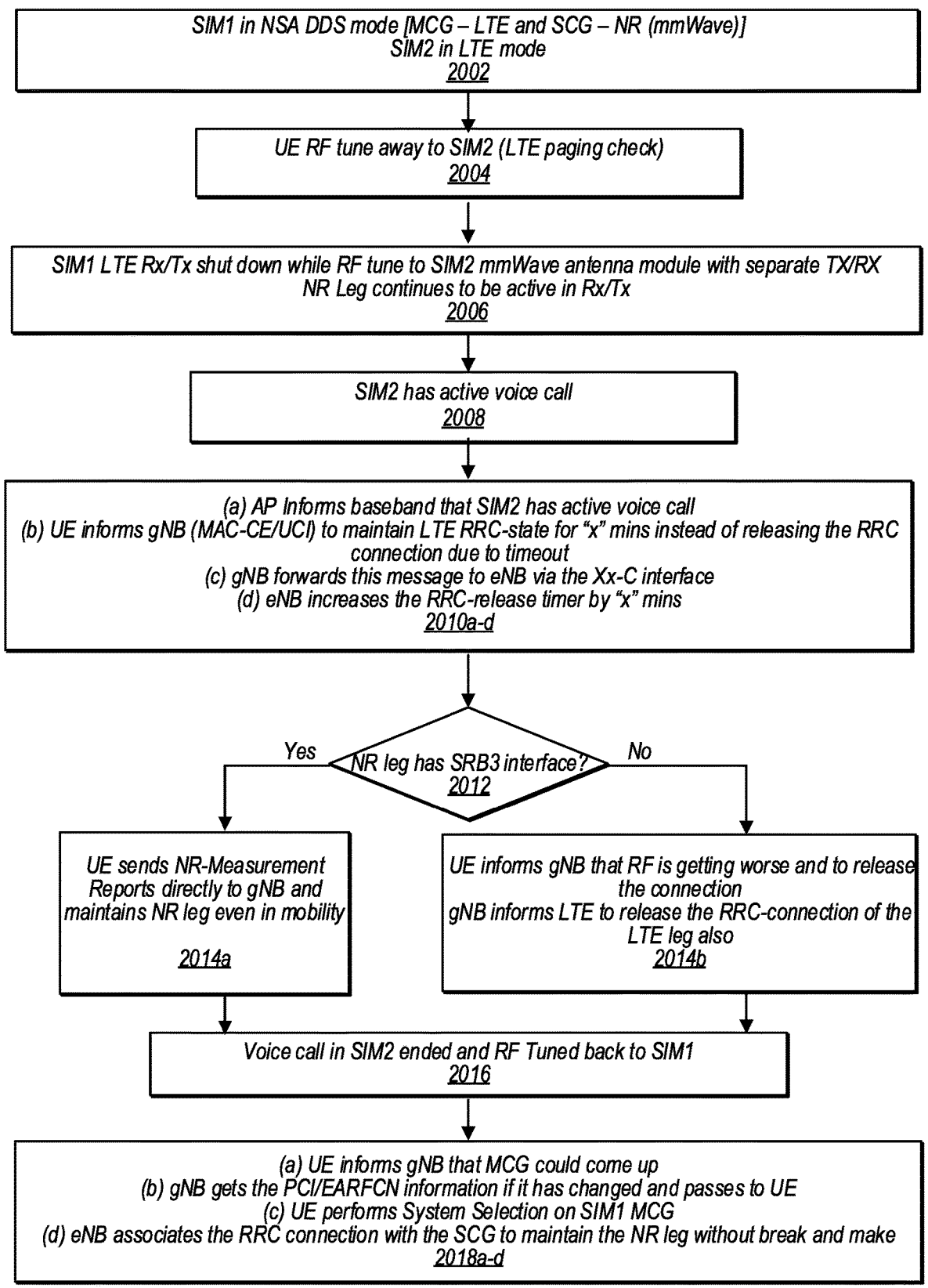
FIG. 20 is a flow diagram illustrating example aspects of a method of how the network may assist a UE in maintaining its NR leg connection without breaking it due to a worsening RF connection, according to some embodiments.

FIG. 20—EN-DC DSDS Flow Diagram—Network Assisted Maintaining of UE NR Connection FIG. 20 is a flow diagram corresponding to a wireless device configured for EN-DC and DSDS operation. More specifically, FIG. 20 illustrates an example method of how the network may assist a UE in maintaining its NR leg connection without breaking it due to a worsening RF connection. This may allow for simultaneous data transfer over the NR link in SIM1 while an active voice call is being performed on SIM2.

For example, in some embodiments and as shown in 2002, the wireless device (e.g., UE) may support MUSIM and include a first SIM (SIM1) in NSA DDS mode corresponding to an LTE connection with a MCG and a NR (mmWave) connection with a SCG. Furthermore, the UE may include a second SIM (SIM2) operating in LTE mode. Additionally, or alternatively in 2004 the UE may perform an RF tune away operation to SIM2 corresponding to an LTE paging check.

Correspondingly, in 2006, SIM1's Tx/Rx resources may be disabled and may further be utilized by SIM2 in its NR leg through use of the mmWave antenna module with separate Tx/Rx capability. Additionally, or alternatively in 2008 SIM2 may have an active voice call.

Accordingly, in 2010a, the AP may inform the baseband that SIM2 has an active voice call. Additionally, or alternatively in 2010b the UE may inform the gNB via MAC-CE or UCI to maintain the LTE RRC-state for "x" minutes instead of releasing the RRC connection due to timeout. Correspondingly, in 2010c, the gNB may forward this message to the eNB via the Xx-C interface and in response the eNB may optionally increase the RRC-release timer by "x" minutes in 2010d.

In 2012, it may be determined whether or not the NR leg has a SRB3 interface. For example, in 2014a if the NR leg is determined to have a SRB3 interface, the UE may be capable of sending NR-Measurement Reports (MRs) directly to the gNB and further maintain this NR leg even in mobility (e.g., roaming). Additionally, or alternatively in 2014b, if the NR leg is determined to lack a SRB3 interface and therefore the UE cannot send measurement reports, the UE may inform the gNB that the RF connection is degrading and to accordingly release the connection. For example, if the NR-RSRP reaches a level of −115 dBm, the UE may inform the gNB to release the connection. In response, the gNB may additionally inform the eNB to release the RRC-connection of the LTE leg.

In 2016, once the voice call in SIM2 has ended (e.g., disconnected) and the UE has performed an RF tuning back to SIM1, the UE may inform the gNB that the MCG could become active in 2018a. Additionally, or alternatively, in 2018b, the gNB may receive altered PCI/EARFCN information and further transmit this information to the UE. Correspondingly, the UE may then perform a System Selection procedure on the SIM1 MCG in 2018c. Finally, in 2018d, the eNB may associate the RRC connection with the SCG so as to maintain the NR leg without breaking and re-making the connection.

the SIM1 gNB may then transmit a SGNB Modification Required message to the SIM1 eNB which may include IEs used to indicate a validity timer of "x" seconds and that the UE context should be retained. In response, the SIM1 eNB may transmit back to the SIM1 gNB a SGNB Modification Confirm message as shown in 1914. In 1916, the gNB may inform the UE (via MAC-CE and/or DCI) that all uplink/downlink (UL/DL) data could pass through the gNB over the NR leg.

Next, in 1918, the UE may transmit a RRC/NAS message to the eNB. This message may indicate to the eNB that the UE should perform an RF tune away. Correspondingly, in 1920 the UE may transmit, to the SIM1 gNB, an LTE NAS message including UEAssistanceInformation on SRB3 piggybacked with the message. Furthermore, in 1922, having received the piggybacked information in the LTE NAS message from the UE, the gNB may then transmit a RRC Transfer message to the eNB. Correspondingly, in 1924 the gNB may also send an RRCReconfiguration message piggybacked with the LTE NAS message and an acknowledgement (ACK). Finally, in response to this and upon completing the RRC transfer procedure, the UE may transmit a RRCReconfiguration Complete message to the gNB in 1926.

Tune Away Indication to NW for MCG Only

In some embodiments, a UE may be configured for MUSIM and have a first SIM (SIM1) supporting LTE and NR communications and a second SIM (SIM2) supporting LTE communications in an IDLE state. Based on SIM2's DRX cycle, SIM1's network may not schedule downlink data on SIM1. However, if SIM1 UE is performing an RF tune away procedure from the MCG leg, the network may still be able to utilize the SCG leg to schedule resources and transfer data to the UE. Accordingly, it may be beneficial for the UE to indicate to the network that SIM1 is performing said RF tune away from the MCG leg.

EXAMPLE EMBODIMENTS

Still another example embodiment may include a device, comprising: an antenna; a radio coupled to the antenna; and a processing element operably coupled to the radio, wherein the device is configured to implement any or all parts of the preceding examples.

Yet another example embodiment may include a method, comprising: by a device: performing any or all parts of the preceding examples.

A further embodiment may include a non-transitory computer accessible memory medium comprising program instructions which, when executed at a device, cause the device to implement any or all parts of any of the preceding examples.

A still further example embodiment may include a computer program comprising instructions for performing any or all parts of any of the preceding examples.

A yet further example embodiment may include an apparatus comprising means for performing any or all of the elements of any of the preceding examples.

Still another example embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
a first modem for performing communication using a first radio access technology (RAT);
a second modem for performing communication using a second RAT;
at least one processor coupled to the first and second modems, configured to:
connect, using a first subscriber identity module (SIM), to a first base station according to the first RAT and a second base station according to the second RAT;
connect, using a second SIM, to a third base station according to the first RAT;
perform a call using the second SIM and according to the first RAT;
in response to performing the call using the second SIM:
transmit, using the first SIM, an indication to the second base station of disabling of the first RAT for the first SIM;
disable the first RAT for the first SIM; and
perform, using the first SIM, data communication according to the second RAT while the call is performed using the second SIM.

2. The wireless device of claim 1, wherein performing the call using the second SIM is using voice over long-term evolution (VOLTE).

3. The wireless device of claim 1, wherein the first RAT corresponds to long-term evolution (LTE) and the second RAT corresponds to new radio (NR).

4. The wireless device of claim 1, wherein the at least one processor is further configured to:
transmit, using the first SIM, a registration request message to the second base station in order to reconfigure the first SIM from a non-standalone (NSA) configuration to a stand-alone (SA) configuration.

5. The wireless device of claim 4, wherein the at least one processor is further configured to:
receive, using the first SIM, a registration accept message from the second base station in response to the registration request message.

6. The wireless device of claim 5, wherein the at least one processor is further configured to:
reconfigure, in response to receiving the registration accept message, the first SIM from a non-stand alone (NSA) configuration to a stand-alone (SA) configuration.

7. A method, comprising:
connecting, using a first subscriber identity module (SIM), to a first base station according to a first radio access technology (RAT) and a second base station according to a second RAT;
connecting, using a second SIM, to a third base station according to the first RAT;
performing a call using the second SIM and according to the first RAT;
in response to performing the call using the second SIM:
transmitting, using the first SIM, an indication to the second base station of disabling of the first RAT for the first SIM;
disabling the first RAT for the first SIM; and
performing, using the first SIM, data communication according to the second RAT while the call is performed using the second SIM.

8. The method of claim 7, wherein performing the call using the second SIM is using voice over long-term evolution (VOLTE).

9. The method of claim 7, wherein the first RAT corresponds to long-term evolution (LTE) and the second RAT corresponds to new radio (NR).

10. The method of claim 7, further comprising:
transmitting, using the first SIM, a registration request message to the second base station in order to reconfigure the first SIM from a non-standalone (NSA) configuration to a stand-alone (SA) configuration.

11. The method of claim 10, further comprising:
receiving, using the first SIM, a registration accept message from the second base station in response to the registration request message.

12. The method of claim 11, further comprising:
reconfiguring, in response to receiving the registration accept message, the first SIM from a non-stand alone (NSA) configuration to a stand-alone (SA) configuration.

13. An apparatus, comprising:
a processor configured to, when executing instructions stored in a memory, perform operations comprising:
connecting, using a first subscriber identity module (SIM), to a first base station according to a first radio access technology (RAT) and a second base station according to a second RAT;
connecting, using a second SIM, to a third base station according to the first RAT;
performing a call using the second SIM and according to the first RAT;
in response to performing the call using the second SIM:
transmitting, using the first SIM, an indication to the second base station of disabling of the first RAT for the first SIM;
disabling the first RAT for the first SIM; and
performing, using the first SIM, data communication according to the second RAT while the call is performed using the second SIM.

14. The apparatus of claim 13, wherein performing the call using the second SIM is using voice over long-term evolution (VOLTE).

15. The apparatus of claim 13, wherein the first RAT corresponds to long-term evolution (LTE) and the second RAT corresponds to new radio (NR).

16. The apparatus of claim 13, wherein the instructions are further executable to cause the processor to perform additional operations comprising:
transmitting, using the first SIM, a registration request message to the second base station in order to reconfigure the first SIM from a non-standalone (NSA) configuration to a stand-alone (SA) configuration.

17. The apparatus of claim 16, wherein the instructions are further executable to cause the processor to perform additional operations comprising:
receiving, using the first SIM, a registration accept message from the second base station in response to the registration request message.

18. The apparatus of claim 17, wherein the instructions are further executable to cause the processor to perform additional operations comprising:
reconfigure, in response to receiving the registration accept message, the first SIM from a non-stand alone (NSA) configuration to a stand-alone (SA) configuration.

19. The apparatus of claim 13, wherein performing the call using the second SIM is via a circuit-switched fallback procedure.

20. The apparatus of claim 13, wherein the processor is a baseband processor.

* * * * *

UNITED STATES PATENT AND TRADEMARK OFFICE
CERTIFICATE OF CORRECTION

PATENT NO. : 12,289,782 B2
APPLICATION NO. : 17/778363
DATED : April 29, 2025
INVENTOR(S) : Alosious Pradeep Prabhakar et al.

Page 1 of 1

It is certified that error appears in the above-identified patent and that said Letters Patent is hereby corrected as shown below:

In the Claims

Column 26, Line 21, delete "VOLTE" and substitute --VoLTE--.
Column 26, Line 61, delete "VOLTE" and substitute --VoLTE--.
Column 28, Line 3, delete "VOLTE" and substitute --VoLTE--.

Signed and Sealed this
Seventeenth Day of June, 2025

Coke Morgan Stewart
*Acting Director of the United States Patent and Trademark Office*